Patented Jan. 13, 1931

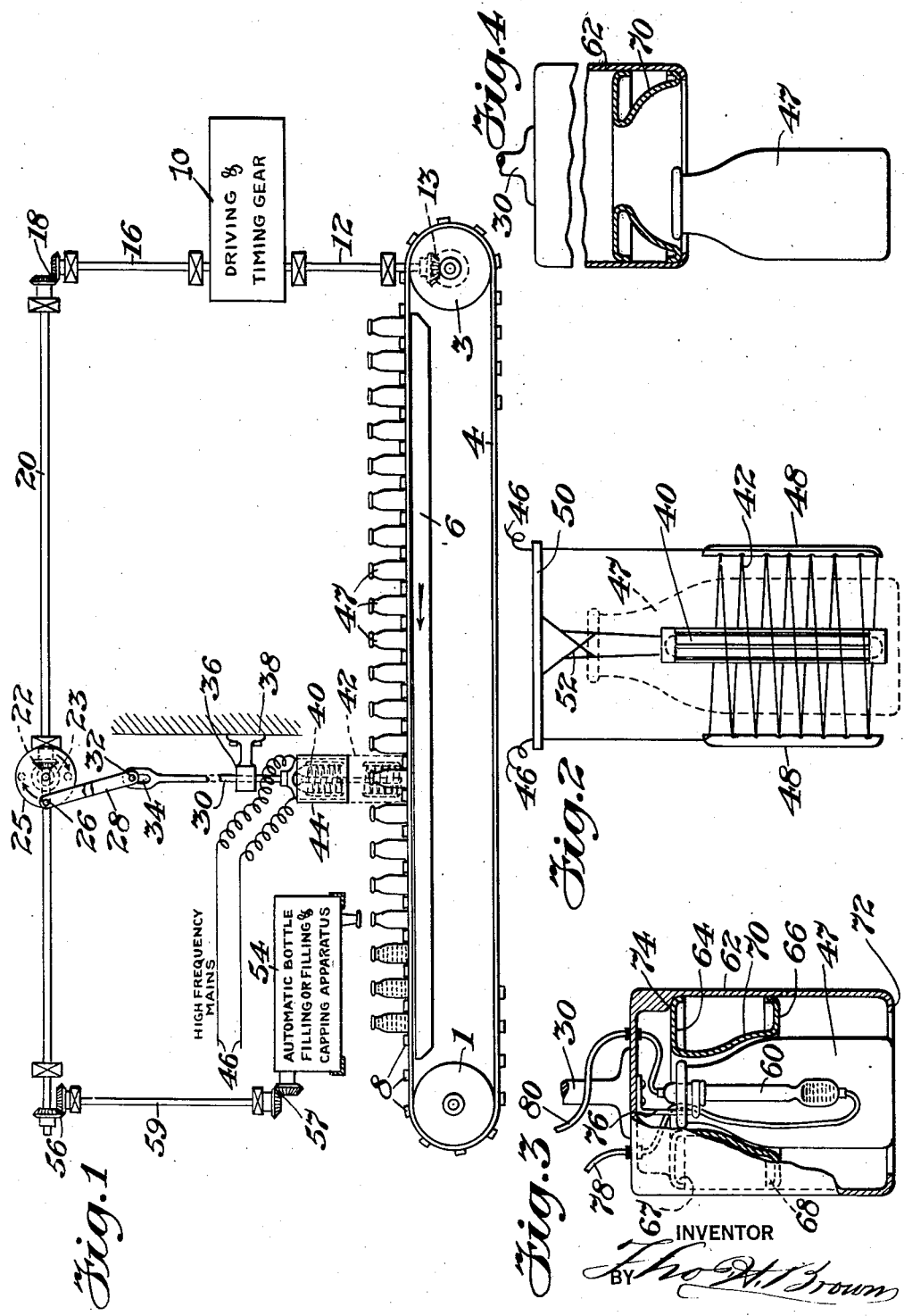

1,788,906

UNITED STATES PATENT OFFICE

THOMAS H. BROWN, OF CHATHAM, NEW JERSEY, ASSIGNOR TO GENERAL ELECTRIC VAPOR LAMP CO., OF HOBOKEN, NEW JERSEY, A CORPORATION OF NEW JERSEY

STERILIZING SYSTEM

Original application filed December 11, 1926, Serial No. 154,161. Divided and this application filed December 14, 1927. Serial No. 240,047.

The present invention relates to apparatus for sterilizing bottles and other containers, and for handling them to automatically bring the sterilizing means and the empty containers together and to separate them after the sterilizing action. The invention more particularly relates to means for sterilizing the interior of containers by means of radiation, rich in ultra-violet rays. The invention further relates to apparatus for sterilizing containers by means of ultra-violet radiation and for filling, or filling and closing, such containers immediately after they are sterilized.

The invention is described as applied to the sterilization and filling and capping of milk bottles, but is applicable for use in the arts generally, particularly where glass, or similar, containers are used as receptacles for pasteurized, sterilized, or other processed goods, to insure that the container itself is sterile.

Various objects and advantages of the invention will be obvious from the following particular description of the forms of apparatus embodying the invention, or from an inspection of the accompanying drawings; and the invention also consists in certain new and novel features of construction and combination of parts hereinafter set forth and claimed.

In the accompanying drawings there is shown for purposes of illustration one form of apparatus, with certain modifications thereof embodying the invention, in which:

Fig. 1 is a diagrammatic view in elevation of a device embodying the invention,

Fig. 2 is an elevation of a device, partly diagrammatic, illustrating one form of my invention, and Figs. 3 and 4 are diagrammatical views in part section, showing another form of my invention.

The invention is particularly adapted to the packaging of various classes of goods which it is important to distribute to the trade in as sanitary condition as possible, such as foods, medicines and toilet preparations. These classes of goods are mainly shipped in small packages, and it is generally desirable to ship them in packages, or containers, which have been filled while dry and sterile. The container material may be glass, porcelain, clay, or the special card-board packages designed to be impervious to dust and moisture. The invention is described in detail as applied to the distribution of milk, but it is understood that such an application of the apparatus and process is only illustrative, and that any product, such as those indicated above, which admits of considerable subdivision for distribution to the trade, may be advantageously substituted for milk, and analogous apparatus and methods used.

In Figs. 1 and 2 of the drawing, a pair of pulleys or rolls 1 and 3 carry an endless belt conveyor 4 which moves or slides over a supporting table 6 and carries the spacing members 8. In place of the belt and endless chain of solid blocks linked together can be used. A driving apparatus or gear 10 acts through the shaft 12 and bevel gears 13 to drive conveyor 4, intermittently in steps, and at a predetermined rate, in a manner hereinafter fully described. Said driving apparatus also drives a shaft 16, intermittently in steps, in timed relation to said shaft 12. Through bevel gears 18 said shaft 16 drives a shaft 20, which is positioned over said belt 4 and carries a bevel gear 22 which drives through bevel gear 23 a crank disc 25 having a crank pin 26. A rod 28 connects said pin 26 to a reciprocating rod 30 through a pin 32 on connecting rod 28 and slot 34 at the end of said rod 30, whereby a sliding or loose connection is made. A bearing 36 mounted to a fixed member or wall 38 guides said reciprocating rod 30 in its movement. At its lower end said rod 30 carries the high frequency mercury quartz lamp 40 and the high frequency induction coil 42 therefor, enclosed by the cylindrical casing 44, which is open at its lower end. The electric main 46, 46 serves to connect said coil 42 to a suitable source, not shown, of high frequency varying current, provision being made for the movement of the electrical connection with said coil 42. Fig. 2 shows details of the lamp 40 and the coil 42 in operable relation for sterilizing a milk bottle, the lamp being positioned in the bottle and the coil encircling it outside the bottle, in position to induce a discharge producing current in said lamp. The supporting strips 48, 48 for coil 42 are connected to the stretcher 50, diagrammatically shown in Fig. 2, by the said enclosing casing or cylinder 44, and rigid members 52 mount said lamp 40 to said member 50.

In Fig. 1 is also shown a bottle filling and capping machine 54 which is operated from said shaft 20 through the bevel gears 56 and 57 and the shaft 59 and which is mounted over said conveyor 4 to one side of said sterilizer lamp 40.

In the use and operation of the apparatus of figures 1 and 2 the driving apparatus 10, by means of a series of gears and Geneva stop mechanism in a manner well known in the mechanical arts is made to drive said conveyor belt 4 in a counter clockwise direction in steps, with a given period of rest between each step, and the lamp 40 and coil 42, with the rod 30 are caused to move downwardly toward the end of each step movement, or at the beginning of each rest period, until said casing 44, in which said lamp and coil are mounted, is brought to rest in a position, on, or close to said conveyor 4. The casing 44 with its lamp and coil are left in this rest position for a given period, determined partly by the length of the slot 34, and are then through the same driving means lifted from the rest position to a distance high enough to permit the passage thereunder of a bottle, or container, positioned on said conveyor 4 before the next step of motion of said conveyor 4 commences. As the conveyor 4 is driven in a step by step motion a continued series of containers or bottles, such as the milk bottles 47, are placed thereon for conveyance to and presentation to said sterilizing means, a set of spacers, such as the blocks 8, 8 serving to approximately properly predetermine the position of each bottle so that each one successively is brought to rest under said lamp 40, in turn, whereupon the lamp 40 enters the bottle while the coil 42 takes a position about the bottle for the sterilization thereof. The time of rest of the lamp 40 and coil 42 in operative relation to each bottle in turn is predetermined to insure the complete sterilization of the bottle by the ultra-violet radiation from the lamp. The bottles in turn can be filled and capped by the filling and capping apparatus 54, conventionally shown, and of a type well known in the arts. The table, or support 6, under the belt conveyor 4 serves as a rigid support for the bottles during their treatment and filling or capping.

Fig. 3 shows an arc type of lamp 60 which can be used in place of the lamp 40 for producing the ultra-violet radiation. In either case the lamps are the well known types in which the envelope is of fused quartz or other suitable material, transparent to ultra-violet radiation. Figs. 3 and 4 show also a casing 62 in place of the casing 44 above described. This casing 62 carries centering means for the bottles 47, which comprises a pair of spaced apart disc members 64 and 66, and inwardly turned bearing flanges 67 and 68, having an outside diameter suitable for a sliding fit with the inside of said casing 62. Between the members 64 and 66 is mounted the centering funnel 70, having a contour closely resembling the contour at the top of a bottle or container to be handled by the apparatus. As shown this shape is made to suit the neck of a milk bottle. An inturned annular shoulder 72 at the bottom of said casing 62 serves as a lower stop for said funnel 70, and a corresponding upper shoulder 74 serves as an upper stop therefor. The bracket 76 supports said fused quartz envelope mercury vapor arc lamp 60, centrally inside said casing 62 and the leads 78 and 80 serve to connect the lamp to a suitable source of current not shown. In Fig. 4 the centering funnel 70 is shown as having been raised to the top of the casing by the bottle 47, over which the casing has been lowered. This centering device, although not indispensable, serves to properly center the bottle with respect to the lamp and is of particular utility for use with bottles or other containers having comparatively narrow necks. The bottles, or other containers, are placed on the conveyor 4 in an approximately accurate position and misplacements, due to slight variation therefrom, and to variations in the size of the containers with respect to the positioning means (the blocks 8, 8) are taken care of. The funnel as it moves up the sides of the casing closes down on the narrow neck of the bottle and slides it over to a central position as the neck widens.

From the above description of the application of the invention to the packaging of one food product, it will be seen that an important feature resides in utilizing the considerable mass sub-division of the old packaging systems to permit of a very effective sterilization of the separate empty containers, before filling them, and that this new step can be carried out at room temperature, in a clean dry atmosphere, without in any way interfering with the usual operations of packaging.

While I have shown and described and have pointed out in the annexed claims certain features of the invention, it will be understood that various omissions, substitutions and changes in the forms, parts and details of the device illustrated and described and its operation may be made by those skilled in the art without departing from the spirit of the invention.

This application is a division of an application filed Dec. 11, 1926, Serial No. 154,161—sterilizing system.

What I claim as my invention is:

1. In a container sterilizer, a source of radiation rich in ultra-violet rays, means for presenting empty containers to said source of radiation and for removing them therefrom, comprising a conveyor movable past said source of radiation and provided with means for causing it to move in successive steps, with periods of rest therebetween of predetermined duration, and means for moving said source of radiation to a position within each container as it is brought opposite thereto by the conveyor, in combination with means for centering the container with respect to said source of radiation, as the source is moved within the container.

2. In a packaging apparatus, container conveyor means, designed to effect a periodic movement of a series of containers, in combination with mercury arc sterilizing means, and operating means therefor to hold said sterilizing means centrally in each container successively, while the container is empty, and between each periodic movement of the series of containers, by parts designed to mechanically engage the container to be sterilized.

3. In a mechanical sterilizer apparatus, a step-by-step conveyor mechanism provided with means for approximately positioning containers thereon, in combination with reciprocating mechanism carrying a sterilizing agency and container engaging means designed to slide a container into right alignment to receive and inclose the sterilizer agency when actuated by the reciprocating mechanism.

4. In a packaging mechanism a conveyor and a reciprocating sterilizer mechanism, acting at right angles to the motion of the conveyor, and provided with mercury arc sterilizer means, and relief action container engaging means, designed to position an empty container to receive the said sterilizer means.

5. In a system of sterilization, a source of ultra-violet radiation, conveyor means designed to present one of a number of containers adjacent said source for a given time interval, and reciprocating means, carrying said source, and provided with container engagement mechanism designed to initially move the container presented into substantial axial alignment with the source and then maintain said alignment while the said source is inserted within the container and withdrawn therefrom.

Signed at Hoboken in the county of Hudson and State of New Jersey this 9th day of December A. D. 1927.

THOMAS H. BROWN.